US012781812B2

(12) United States Patent
Bosis

(10) Patent No.: US 12,781,812 B2
(45) Date of Patent: Nov. 3, 2026

(54) GUIDE PIN, GUIDE SLEEVE, GUIDE, MAINTENANCE KIT, BRAKE CALIPER, ASSEMBLY METHOD

(71) Applicant: Brembo S.p.A., Curno (IT)

(72) Inventor: Alberto Bosis, Curno (IT)

(73) Assignee: Brembo S.p.A., Curno (IT)

( * ) Notice: Subject to any disclaimer, the term of this patent is extended or adjusted under 35 U.S.C. 154(b) by 611 days.

(21) Appl. No.: 17/930,094

(22) Filed: Sep. 7, 2022

(65) Prior Publication Data

US 2023/0072036 A1 Mar. 9, 2023

(30) Foreign Application Priority Data

Sep. 8, 2021 (IT) ........................ 102021000023180

(51) Int. Cl.
*F16D 55/2265* (2006.01)
*F16D 55/00* (2006.01)

(52) U.S. Cl.
CPC .................. *F16D 55/22655* (2013.01); *F16D 2055/0016* (2013.01)

(58) Field of Classification Search
CPC ........... F16D 55/22655; F16D 55/2262; F16D 65/0087
See application file for complete search history.

(56) References Cited

U.S. PATENT DOCUMENTS 4,926,979 A * 5/1990 Odaka .................. F16D 55/227 188/73.44
5,183,136 A * 2/1993 Maeda .............. F16D 55/22655 188/73.44
5,261,678 A * 11/1993 Takemori .......... F16D 55/22655 277/630
5,927,446 A * 7/1999 Evans .................. F16D 55/227 188/73.44
8,857,576 B2 * 10/2014 Kobayashi .......... F16D 55/2265 188/73.44

(Continued)

FOREIGN PATENT DOCUMENTS

CN 206129942 U * 4/2017
CN 207178408 U * 4/2018

(Continued)

OTHER PUBLICATIONS

JP H0544747 A (Feb. 23, 1993) (Year: 1993).*

(Continued)

*Primary Examiner* — Robert A. Siconolfi
*Assistant Examiner* — Mahbubur Rashid
(74) *Attorney, Agent, or Firm* — Marshall & Melhorn, LLC

(57) ABSTRACT

A guide pin for a floating-type brake caliper of a disc brake where the brake caliper may have a caliper body and a bracket. The guide pin may be configured to be placed between the caliper body and the bracket. The guide pin is configured to connect to a guide sleeve and slide at least partially within the guide sleeve. The guide pin may have a first pin coupling portion. The guide pin may also have a pin (Continued)

sliding portion to guide the guide pin into a sliding housing formed in either the caliper body or the bracket. The guide pin may also have a second pin coupling portion. The first pin coupling portion is arranged between the second pin coupling portion and the pin sliding portion. The first pin coupling portion is threaded to form a threaded coupling between the guide pin and the guide sleeve.

13 Claims, 9 Drawing Sheets

(56) References Cited

U.S. PATENT DOCUMENTS

| | | | | |
|---|---|---|---|---|
| 9,068,611 | B2 * | 6/2015 | Lethorn | F16D 55/22655 |
| 9,587,686 | B2 * | 3/2017 | Morais | F16D 55/227 |
| 10,054,175 | B2 * | 8/2018 | Kula | F16D 55/226 |
| 10,781,872 | B2 * | 9/2020 | Jedele | F16D 55/227 |
| 2013/0161134 | A1 * | 6/2013 | Kobayashi | F16D 55/2265 188/73.44 |

FOREIGN PATENT DOCUMENTS

| | | | | | |
|---|---|---|---|---|---|
| CN | 208010805 | U | * | 10/2018 | |
| CN | 210920081 | U | * | 7/2020 | |
| EP | 2610519 | B1 | * | 6/2016 | F16J 3/046 |
| JP | 2568303 | Y2 | * | 4/1998 | |
| JP | 2007010056 | A | | 1/2007 | |
| JP | 4425737 | B2 | * | 3/2010 | |
| JP | 2015124833 | A | * | 7/2015 | |
| KR | 1020020014209 | A | | 2/2002 | |
| KR | 1020100055082 | A | | 5/2010 | |
| WO | WO-2013080381 | A1 | * | 6/2013 | F16D 55/227 |
| WO | 2013121358 | A1 | | 8/2013 | |
| WO | WO-2018079795 | A1 | * | 5/2018 | F16D 55/2265 |

OTHER PUBLICATIONS

JP-2568303-Y2 (Apr. 8, 1998) (Year: 1998).*

Italian Patent and Trademark Office, Search Report in Application No. IT202100023180, dated May 18, 2022, 8 pages, Munich.

* cited by examiner

GUIDE PIN, GUIDE SLEEVE, GUIDE, MAINTENANCE KIT, BRAKE CALIPER, ASSEMBLY METHOD

FIELD

The present invention refers to a guide pin, as well as to a guide sleeve, as well as to a guide for a brake caliper of the floating type, as well as to a maintenance kit for a brake caliper of the floating type, as well as to a brake caliper of the floating type, as well as to an assembly method for a brake caliper of the floating type.

BACKGROUND

In a disc brake of the floating brake caliper type, the brake caliper comprises a support structure or bracket, adapted to be mounted on a fixed portion of the vehicle and generally arranged to straddle the outer peripheral edge of a brake disc, adapted for rotating around a rotation axis (X-X) defining an axial direction (A-A), and a caliper body mounted in a sliding manner on the support structure by means of special guides. The sliding movement (floating) of the brake caliper (in installed condition) is parallel to the rotation axis of the brake disc (XX) along the axial direction (A-A). In addition, in a disc brake a radial direction (R-R) is defined, substantially orthogonal to said axial direction (A-A).

Generally, the caliper body (i.e the floating structure) comprises a lateral portion, arranged externally to the support structure (generally on the hub side of the braking system), and a cantilevered portion, extending from the lateral portion in axial direction (towards the wheel side) on the support structure.

As known, disc brake discs comprise a bell adapted to associate the disc with a hub of a vehicle, from which an annular portion, referred to as a braking band, extends, which is intended to cooperate with brake pads of a caliper.

The brake caliper carries two braking pads, associated in a sliding manner by at least one pin, arranged inside a housing formed in the support structure so that they can come into contact with the braking surfaces of the disc. A first brake pad, or active brake pad, is pushed against the disc directly by thrust means, or pistons, housed in the lateral portion of the caliper body. A second brake pad, or reaction brake pad, opposed to the first brake pad, is pushed against the disc by the cantilevered portion of the caliper body during the sliding of the caliper body with respect to the support structure or bracket following the reaction resulting from the interaction between the first pad and the disc.

Generally, the floating-type brake caliper guides each comprise a guide pin and a guide sleeve configured to be arranged between the caliper body and the bracket.

Usually, the guide pin is fixed to the bracket by means of a coupling portion insertable into a fixing housing made in the bracket, and it comprises a pin sliding portion adapted for sliding inside a sliding housing made in the caliper body and at least partially internally to the guide sleeve.

According to a known embodiment, the coupling portion of the guide pin comprises a screw with an abutment head adapted to abut the caliper body, and a guide pin shank internally comprising a threaded housing adapted to connect with the screw and having a respective abutment head adapted to abut the caliper body on the opposite side with respect to the abutment head of the screw. In this way, by connecting the screw with the pin shank with the respective abutment heads abutting the caliper body, it is possible to make a connection between the guide pin and the caliper body. Solutions of this type are known from KR20020014209 e KR20100055082.

According to a further known embodiment, the coupling portion of the pin is threaded, and the fixing housing of the caliper body is threaded, so as to make a threaded coupling between the guide pin and the caliper body. A solution of this type is illustrated by JP2007010056.

According to a known embodiment, the guide sleeve is fixedly connectable from one end to the guide pin and from the other end to the sliding housing, through a first annular lip and a second annular lip, respectively, which project from the sleeve body in radial direction. The first annular lip projects internally radially towards the guide pin and is configured to be received in a pin groove made on the guide pin so as to form an undercut fit between the guide pin and the guide sleeve. The second annular lip projects externally radially towards the bracket and is configured to be received in a bracket groove made in the sliding housing so as to form an undercut fit between the bracket and the guide sleeve. In this way, the guide sleeve, being made of elastomeric material, allows a reversible fit with the guide pin and the bracket, and allows to make a tight fit with the guide pin and with the bracket, protecting on the one hand the guide pin from corrosive phenomena and preventing dust particles, or liquid, of the external environment to come into contact with the guide pin and/or to access the sliding housing.

Although the guides of known type meet the need to protect the guide pin and the sliding housing from solid or liquid particles of the external environment, it was found that the undercut fit between guide pin and guide sleeve makes known-type guides disadvantageous.

According to a disadvantageous aspect, to make a guide pin of known type, a turning step of the guide pin so as to form the groove to fix the guide sleeve to the guide pin is required, thus increasing the production costs of the guide pin.

According to a further disadvantageous aspect, in the maintenance operations for the brake caliper and/or in the assembly and/or replacement operations for known-type guides, the fixing step the guide sleeve to the guide pin is separate from the fixing step the guide pin to the bracket, making it necessary to have expert manual skills of a user and increasing the probability of assembly errors, as well as increasing the time required for maintenance.

Further, in case of advanced wear of the guide sleeve, the undercut connection, although maintaining the connection between guide sleeve and guide pin, could lose its seal and allow liquids to pass through (water) from the outside, favoring the onset of corrosive phenomena for the guide pin compromising the efficiency and operation of the braking system, making frequent visual inspections of the brake caliper necessary to evaluate its functionality.

The need is therefore felt in the sector to realize solutions of floating-type brake caliper guides which involve a reduced number of processing steps, by decreasing production costs and the selling price, and that they are simple to make, while ensuring a tight connection of guide sleeve to the guide pin that is safe and long-lasting, as well as making it possible to simplify and reduce the times of the assembly and maintenance steps for the floating-type brake calipers.

Therefore, the problem underlying the present invention is that of devising a guide pin, as well as a guide sleeve, as well as a guide, as well as a maintenance kit, as well as a brake caliper, which have structural and functional characteristics such as to satisfy the aforementioned needs and to obviate, at the same time, the drawbacks mentioned with reference to the known art and to satisfy the aforementioned felt needs.

SUMMARY

The present invention aims to provide a guide for floating type brake calipers that allows a simple, safe and durable connection of a guide pin to a guide sleeve, which allows at the same time to reduce the production costs of the guide itself and simplify the maintenance, assembly or disassembly operations of the brake caliper.

This and other purposes and advantages are achieved with a guide pin, as well as a guide sleeve, as well as a guide, as well as a maintenance kit, as well as a brake caliper, as well as an assembly method of a brake caliper according to the claims.

Some advantageous embodiments are the object of the dependent claims.

Thanks to the proposed solutions, it is possible to ensure a coupling between the guide pin and the guide sleeve, avoiding making grooves on the guide pin through turning steps, thus reducing the time required for making the guide pin, as well as production costs.

Thanks to the proposed solutions, it is possible to make a thread coupling between the guide pin and the guide sleeve, which allows a simple and safe connection between the two guiding components, reducing the possibility of incorrect coupling with respect to known solutions, as well as simplifying the assembly and disassembly steps of the guide placed between the bracket and the caliper body of the brake caliper.

Thanks to the proposed solutions, it is possible to provide a guide for floating calipers, with superior protection of the guide pin compared to known solutions. Indeed, thanks to the thread coupling between the guide pin and the guide sleeve, it is possible to have a first sealing portion, as well as thanks to the realization of sealing lips made on the sleeve, it is possible to make a safe seal with the bracket and with a sealing surface of pin downstream of the thread that connects the guide pin to the guide sleeve.

Thanks to the proposed solutions, the coupling between the guide pin and the guide sleeve occurs at least partially concurrently with the coupling between the guide pin and the bracket or the caliper body, in a same step.

DESCRIPTION OF THE DRAWINGS

Additional features and advantages of the guide pin, as well as of guide sleeve, as well as of the guide, as well as of the brake caliper will appear from the following description of their preferred embodiment examples, given for indicative and non-limiting purposes, with reference to the attached figures in which.

DETAILED DESCRIPTION

Figure 3:
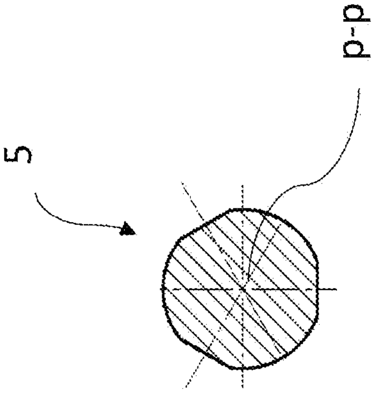
FIG. 3 represents, in front view perpendicular to the of guide pin axis, a section of the pin sliding portion.
Figure 1:
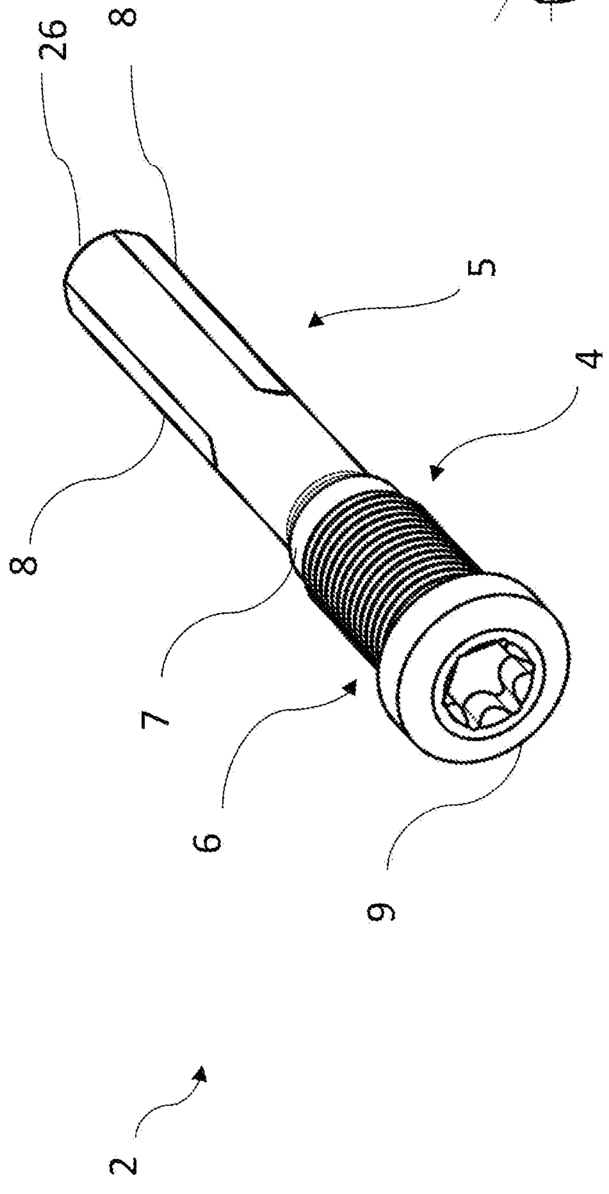
FIG. 1 represents, in axonometry, a guide pin comprising a threaded first pin coupling portion, or main guide pin, according to an embodiment of the present invention.
Figure 2:
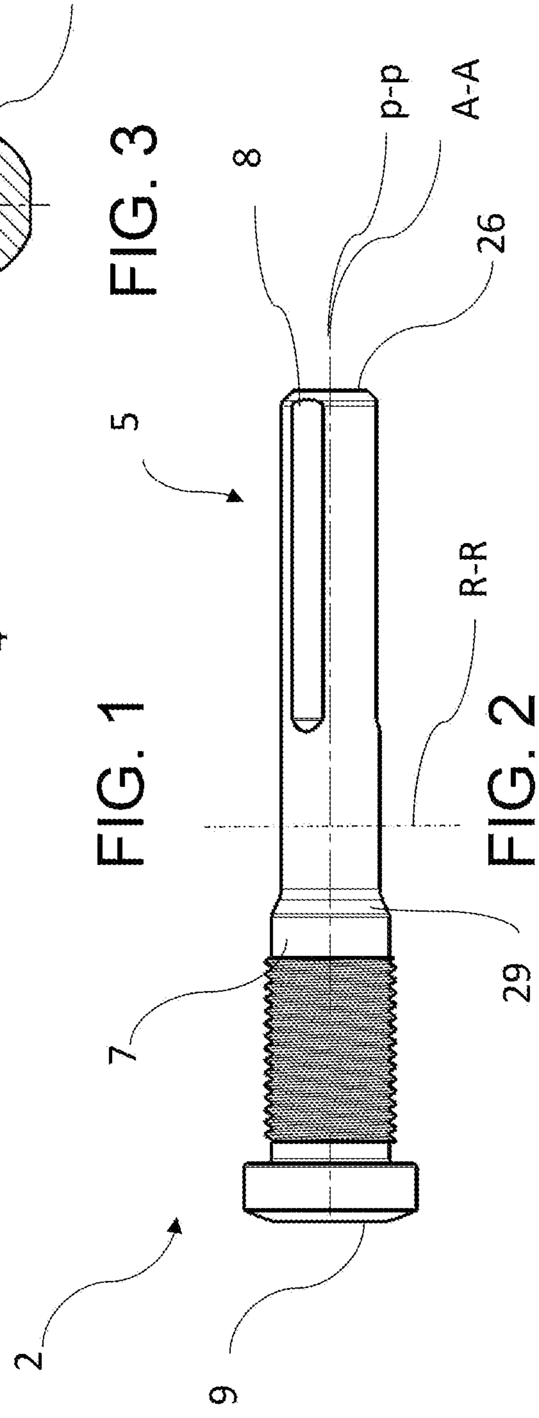
FIG. 2 represents, in side view, the guide pin of FIG. 1.
Figure 4:
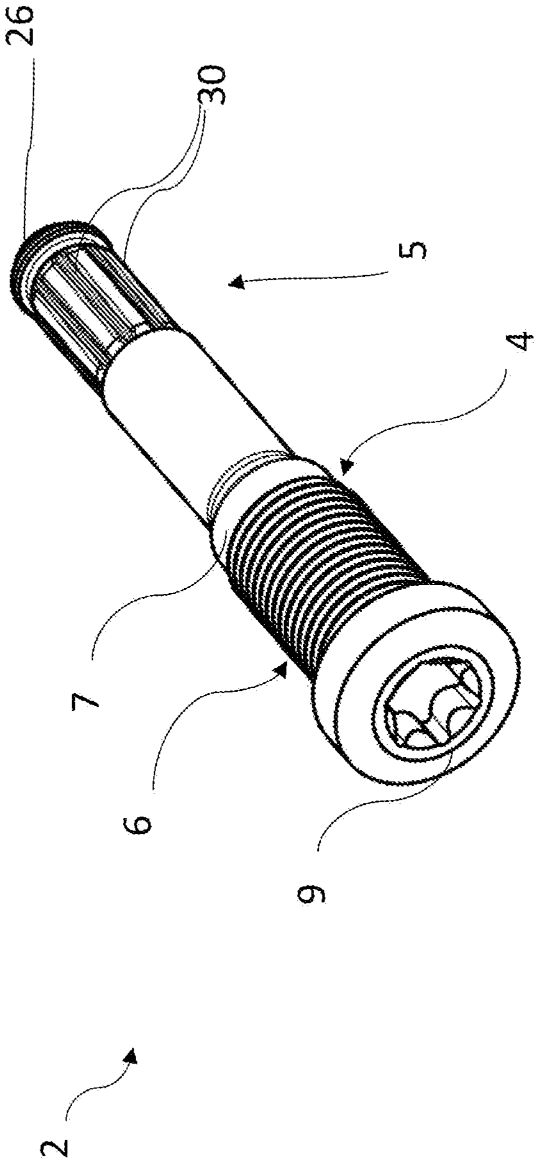
FIG. 4 represents, in axonometry, a guide pin comprising a threaded first pin coupling portion, or secondary guide pin, according to an embodiment of the present invention.
Figure 5:
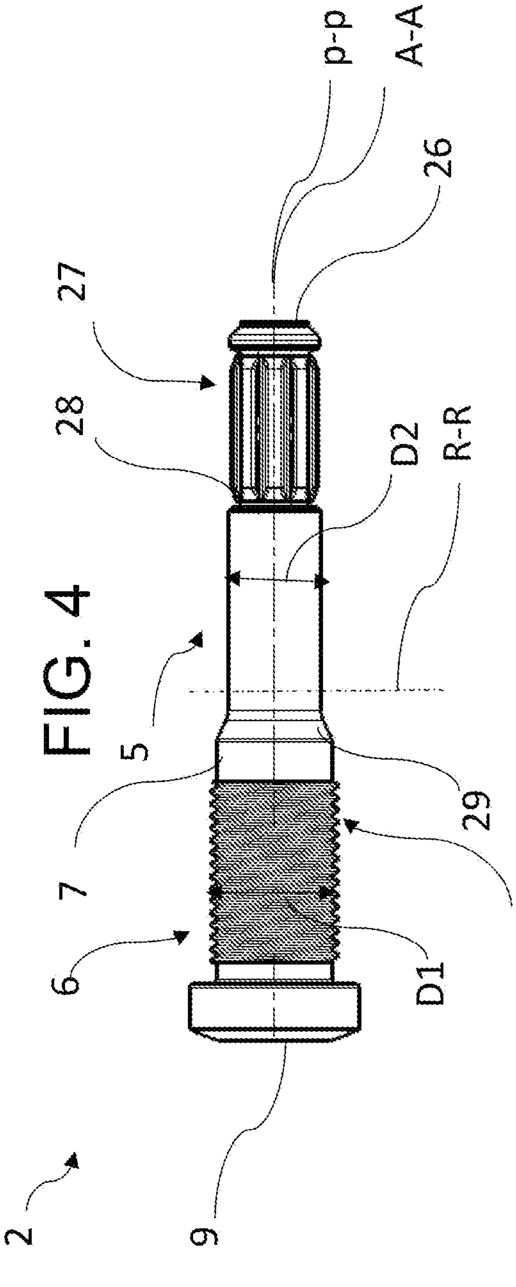
FIG. 5 represents, in side view, the guide pin of FIG. 4.
Figure 6:
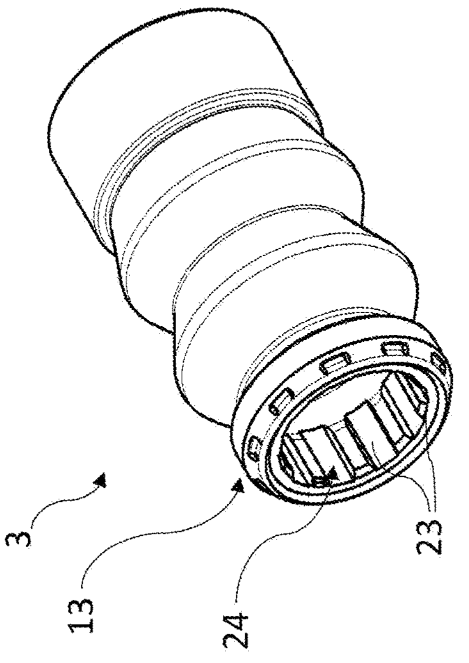
FIG. 6 represents, in axonometry, a guide sleeve according to the present invention, in which a second sleeve coupling portion is visible that protrudes externally radially, and a sleeve contact portion is visible having, internally, longitudinal grooves to reduce the contact area between the guide sleeve and a pin sliding portion.
Figure 7:
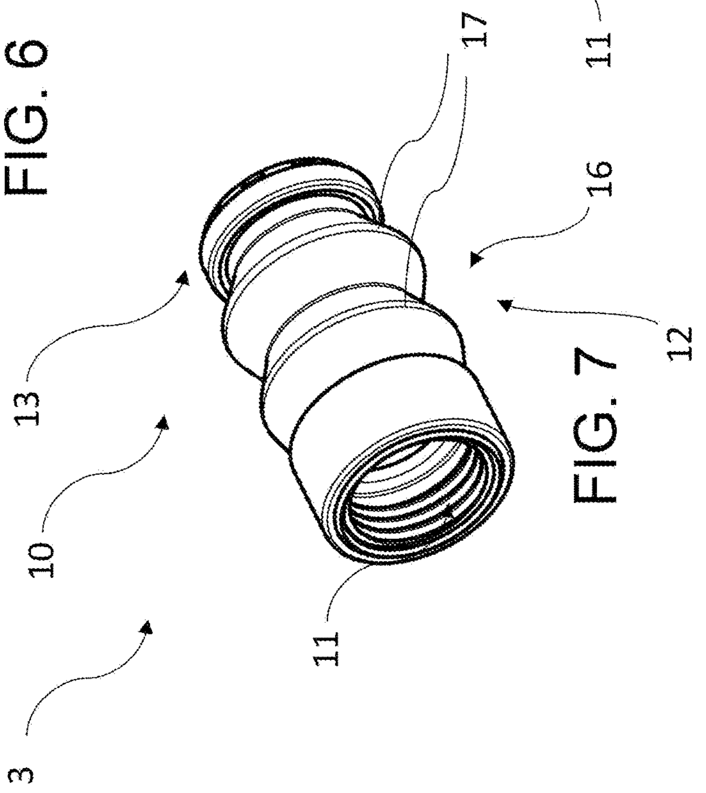
FIG. 7 represents, in axonometry, the guide sleeve of FIG. 6, from a diametrically opposite view, in which a first sleeve coupling portion is visible, internally threaded to couple with the first pin coupling portion, and a bellows sleeve central portion in extended configuration.
Figure 8:
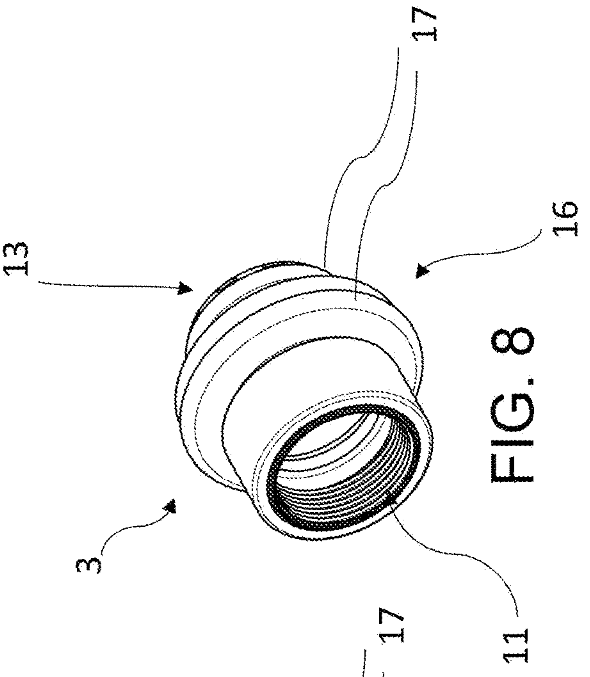
FIG. 8 represents, in axonometry view, the guide sleeve of FIG. 6, in which the bellows sleeve central portion is in retracted configuration.
Figure 9:
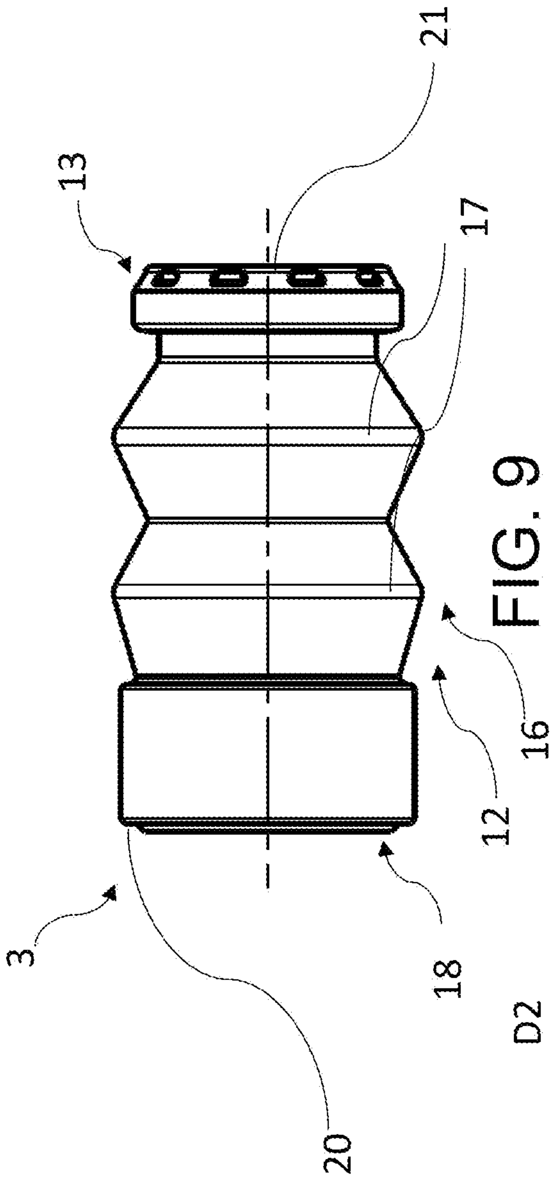
FIG. 9 represents the guide sleeve of FIG. 6 in side view.
Figure 10:
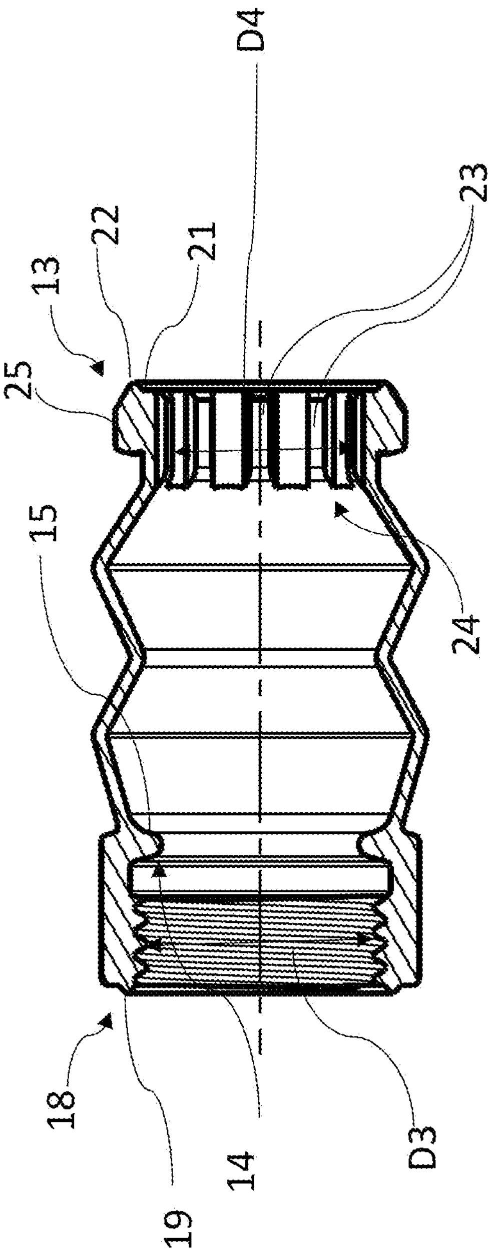
FIG. 10 represents the guide sleeve of FIG. 8 in partially sectioned view with respect to a symmetry axis of the guide sleeve.
Figure 11:
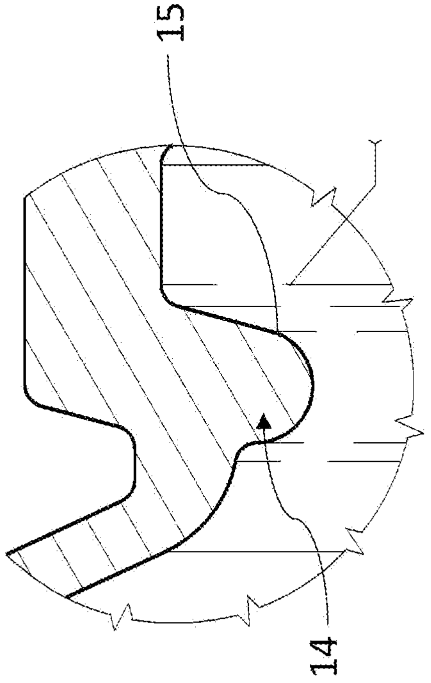
FIG. 11 illustrates an enlarged detail of the FIG. 10, in which a first sleeve sealing portion is visible which projects radially internally from the sleeve body to provide a 360 degree seal with the body of the pin.
Figure 12:
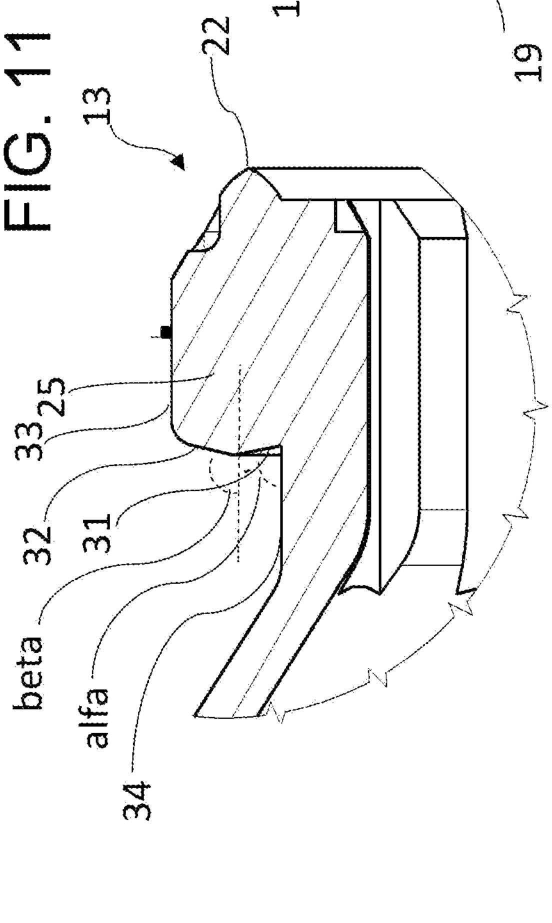
FIG. 12 illustrates an enlarged detail of the FIG. 10, in which a second sleeve coupling portion is shown which projects externally radially from the sleeve body to be received in a radial fixing groove formed in the sliding housing in the caliper body or in the bracket so as to make a undercut fit between the guide sleeve and the caliper body or the bracket, and in which a sleeve fixing lip is shown which projects externally along the axial direction from the second coupling portion that is inserted into an appropriate axial groove made in the radial fixing groove.
Figure 13:
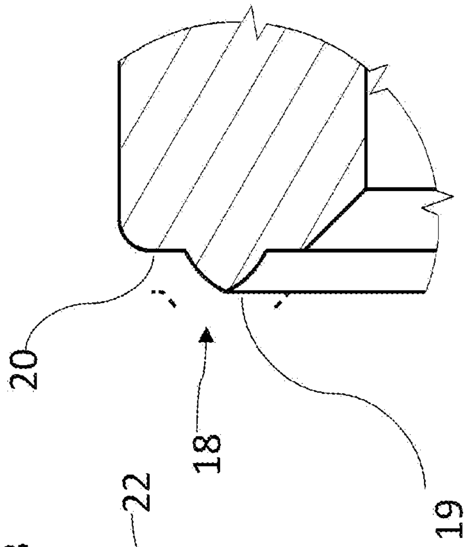
FIG. 13 illustrates an enlarged detail of the FIG. 10, in which a second sleeve sealing portion is shown projecting from the sleeve body externally along the axial direction so as to provide a 360° seal between the sleeve and the bracket or the caliper body.
Figure 14:
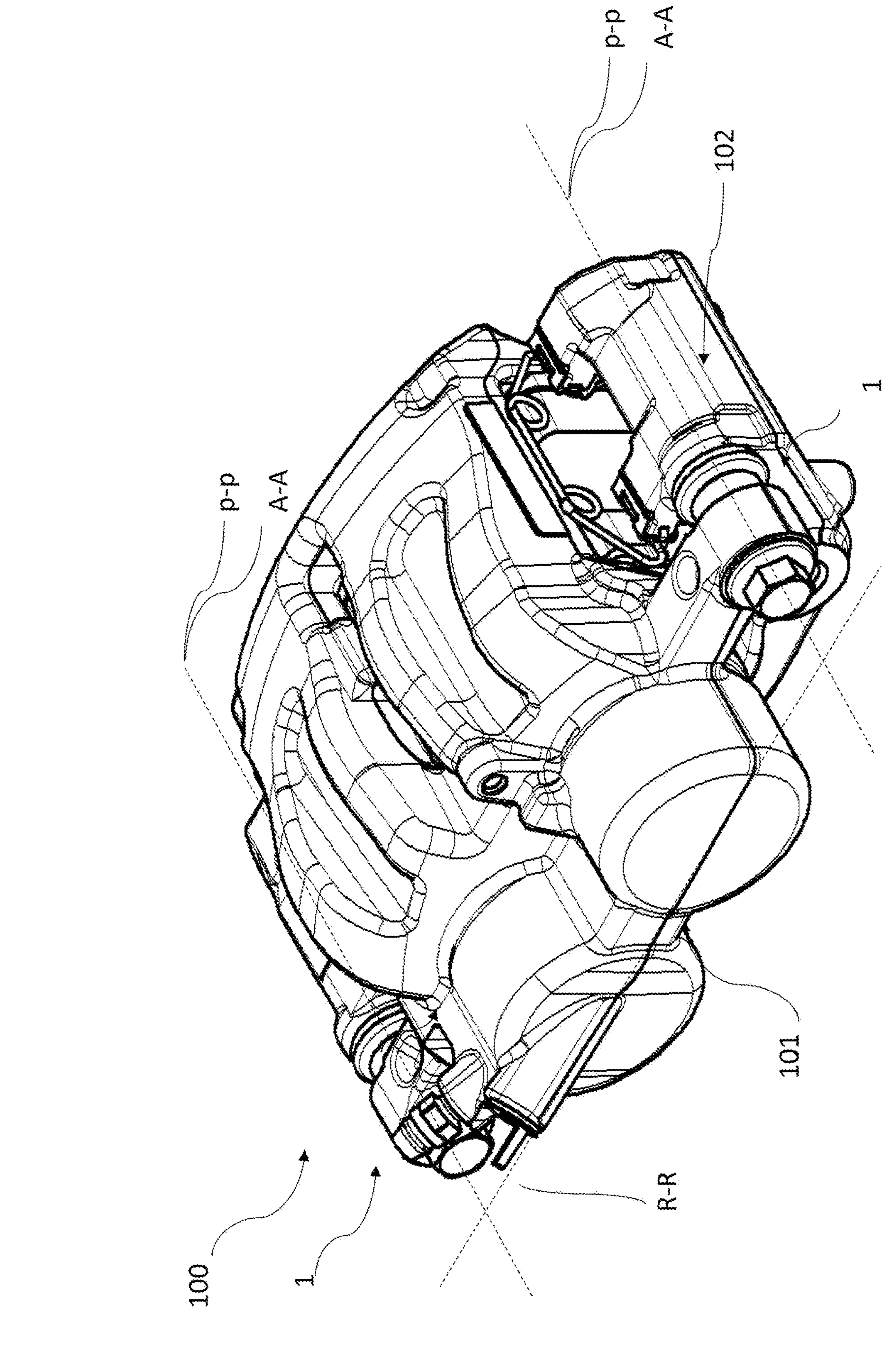
FIG. 14 illustrates, in axonometric view, a brake caliper, according to the present invention, comprising a caliper body mechanically connected, in relative sliding, to a bracket by means of at least one guide according to the present invention.
Figure 15:
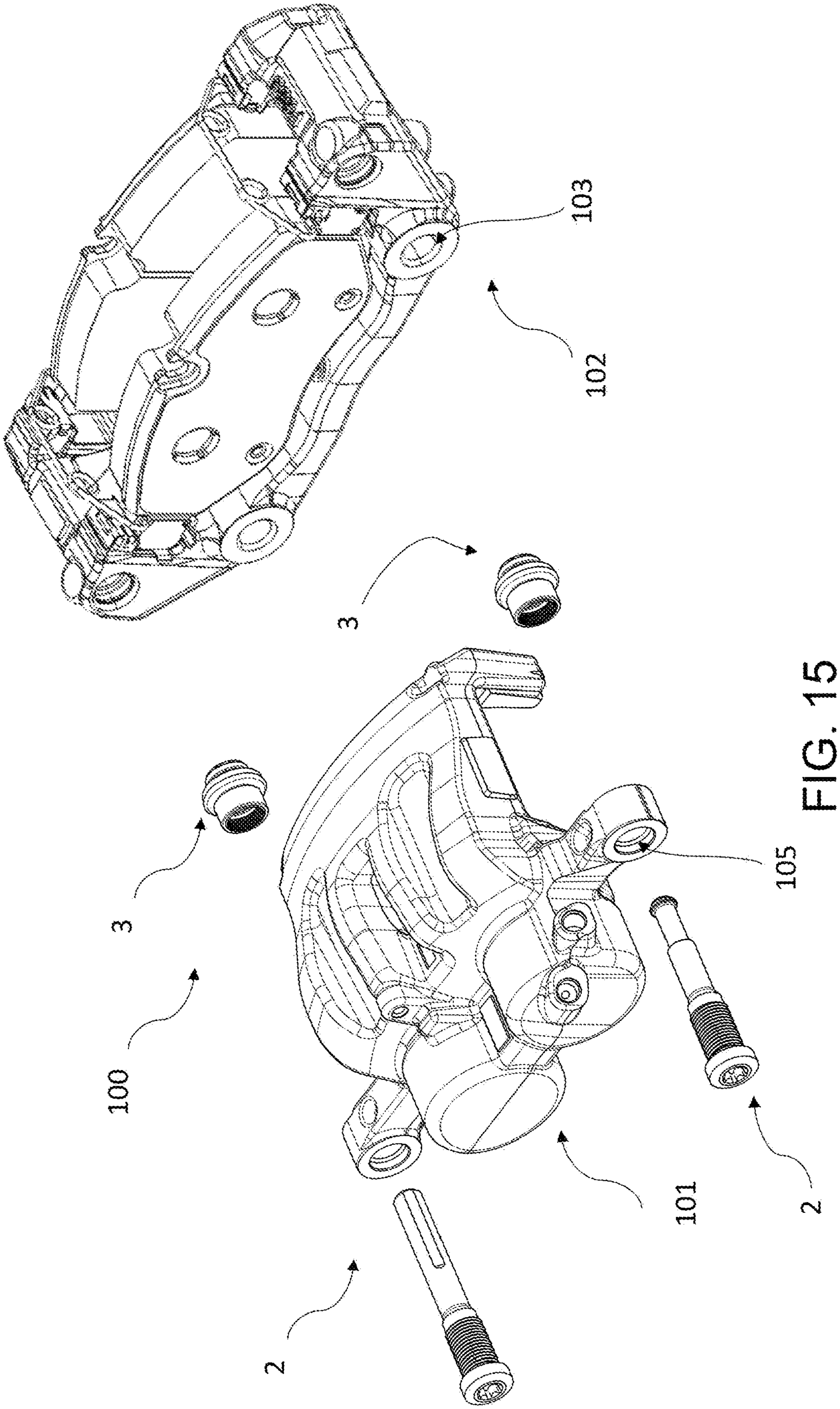
FIG. 15 illustrates, in axonometric view, an exploded view of the brake caliper of FIG. 14, in which the caliper body, two guides according to the present invention disassembled in respective guide pins and respective guide sleeves, and the bracket comprising respective housing pockets for two opposite braking pads, are shown.
Figure 16:
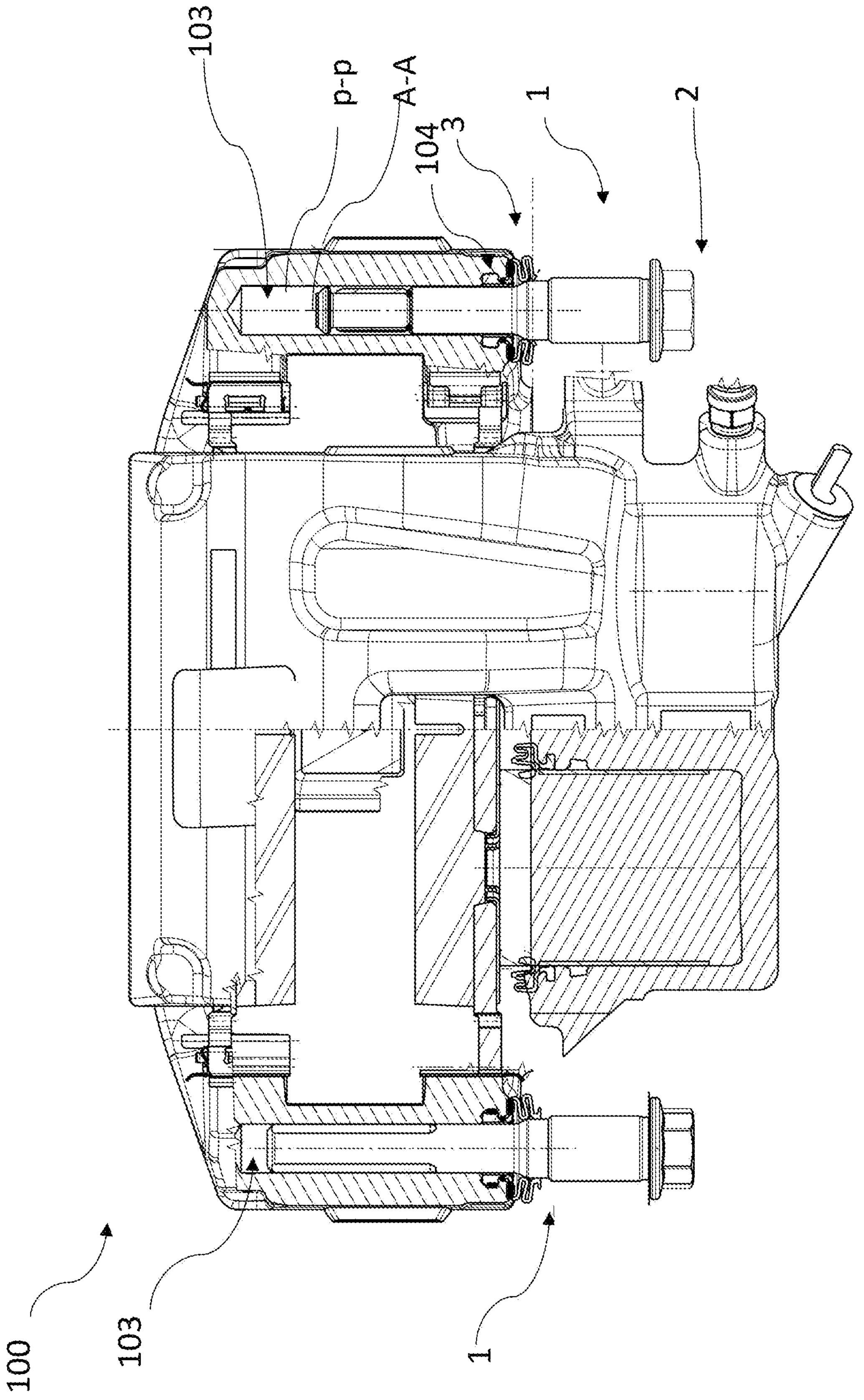
FIG. 16 illustrates, in a partially sectioned view along a plane passing through the respective symmetry axes of the two guides, the guide pin, or primary guide pin, according to FIG. 1, sliding in a respective primary sliding housing formed in the bracket, in which the primary guide pin is fixed to the caliper body and fixed to FIG. 6 sleeve, in turn fixed to the bracket of the brake caliper, as well as the guide pin, or secondary guide pin, according to FIG. 4, sliding in a respective secondary sliding housing formed in the bracket, in which the secondary guide pin is fixed to the caliper body and fixed to FIG. 6 sleeve, in turn fixed to the bracket.
Figure 17:
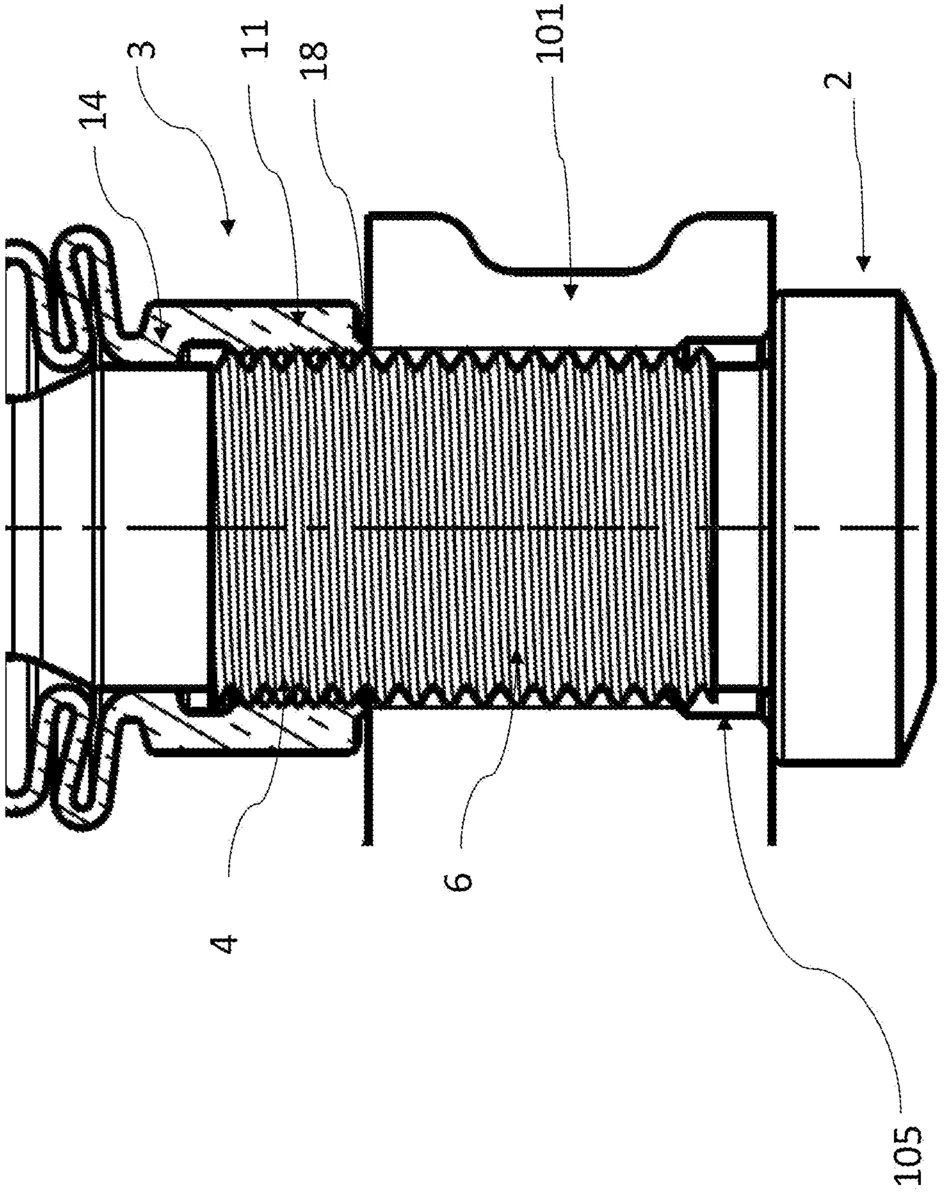
FIG. 17 illustrates a detail of the section in the FIG. 16, in which FIG. 11 first sleeve sealing portion is visible in sealing contact with the guide pin, as well as FIG. 13 second sleeve sealing portion is visible, in the form of a sleeve sealing lip in sealing contact with the caliper body.

In accordance with a general embodiment, reference number 2 indicates a guide pin for a brake caliper 100 of the floating type, in which said brake caliper 100 comprises a caliper body 101 and a bracket 102, mechanically connectable in sliding relationship.

Said guide pin 2 is configured to be placed between said caliper body 101 and said bracket 102 to allow a relative sliding between the caliper body 101 and the bracket 102 along an axial direction A-A.

Said guide pin 2 is configured to connect to a guide sleeve 3 and slide at least partially within said guide sleeve 3.

Said guide pin 2 comprises at least a first pin coupling portion 4, a second pin coupling portion 6, and a pin sliding portion 5. Said first pin coupling portion 4 is arranged between said second pin coupling portion 6 and said pin sliding portion 5.

Said first pin coupling portion 4 is configured to couple said guide pin 2 to said guide sleeve 3.

Said pin sliding portion 5 is configured to guide in a sliding manner said guide pin 2 in a sliding housing 103 formed in said caliper body 101 or said bracket 102.

Said second pin coupling portion 6 is configured to couple said guide pin 2 to either said bracket 102 or said caliper body 101.

Advantageously, said first pin coupling portion 4 is threaded to form a threaded coupling between said guide pin 2 and said guide sleeve 3.

Thanks to the provision of the threaded first pin coupling portion it is possible to allow a simple, quick and safe connection between the guide pin and the guide sleeve.

Thanks to the provision of the threaded first pin coupling portion, it is possible to make the guide pin without providing an annular groove in the pin body to make an undercut coupling with a coupling lip of the guide sleeve.

In accordance with an embodiment, said guide pin 2 comprises a pin sealing portion 7 configured to tightly connect with said guide sleeve 3. In accordance with an embodiment, said pin sealing portion 7 is a smooth and scratch-free portion, in which said pin sealing portion 7 is placed between said first pin coupling portion 4 and said pin sliding portion 5. In this way, it is possible to realize a tight connection insulating the threaded first pin coupling portion from the pin sliding portion.

In accordance with an embodiment, said guide pin 2 is configured to be inserted into a fixing housing 105 made in said bracket 103 or in said caliper body 102. In accordance with an embodiment, said fixing housing 105 is coaxial and opposite to said sliding housing 103.

In the solutions shown, said fixing housing 105 being a housing passing through a thickness of the caliper body 102, and said sliding housing 103 being blind housing formed in the bracket 103.

In accordance with an embodiment, said second pin coupling portion 6 is threaded to form a threaded coupling with a threaded portion of said fixing housing 105.

In accordance with an embodiment, said first pin coupling portion 4 and said second pin coupling portion 6 form a seamless pin threaded portion.

In accordance with an embodiment, when said guide pin 2 is coupled to said caliper body 102 with said second coupling portion 6, said first coupling portion 5 is external to said coupling housing 105.

In accordance with an embodiment, said guide pin 2 is configured to couple to said guide sleeve 3 avoiding realizing on said guide pin 2 grooves to connect said guide pin 2 to said guide sleeve 3 in an undercut manner.

In accordance with an embodiment, said guide pin 2 develops along a pin axis parallel to said axial direction A-A.

In accordance with an embodiment, said guide pin 2 is axially symmetrical with respect to said pin axis.

In accordance with an embodiment, said guide pin 2 is symmetrical with respect to at least one symmetry plane passing through said pin axis.

In accordance with an embodiment, said guide pin 2 comprises a pin head 9 configured to abut said caliper body 102 or said bracket 103 when said second pin coupling portion 6 is fully coupled to said caliper body 102 or said bracket 103. In accordance with an embodiment, said guide pin 2 comprises a pin tip 26, diametrically opposite to said pin head 9.

In accordance with an embodiment, said first coupling portion 4 and said second pin coupling portion 6 substantially have the same diameter, in which said pin sliding portion 5 is tapered compared to the first coupling portion 4. In accordance with an embodiment, said pin sliding portion 5 is stepped tapered with respect to said sliding portion 5 and/or with respect to said pin sealing portion. In accordance with an embodiment, said sliding portion 5 is substantially cylindrical and is jointed to said first pin coupling portion 4 or to said pin sealing portion with a pin tapered portion. In accordance with an embodiment, said pin sliding portion 5 has a second pin diameter D2, smaller than said first pin diameter D3.

In accordance with an embodiment, said pin tapered portion is a truncated cone portion so that said first sleeve coupling portion gradually widens until it takes the diameter of the first pin coupling portion.

In accordance with an embodiment, said pin sliding portion 5 comprises at least one longitudinal groove 8 which extends from said pin tip 26 towards said first pin coupling portion 4, allowing air to be vented from the sliding housing 103 during an assembly operation of the brake caliper 100.

In accordance with an embodiment, said pin sliding portion 5 is a cylindrical portion of pin and said at least one groove forms recessed flat surfaces in said pin cylindrical portion.

In accordance with an embodiment, said at least one axial groove 8 comprises angularly offset axial grooves 8 in odd number.

In accordance with an embodiment, said at least one axial groove 8 comprises three axial grooves 8, each one offset by an angle of 120°, +−5°.

In accordance with an embodiment, said pin sliding portion 5 has an pin annular housing, delimited by at least said pin tip. In accordance with an embodiment, said pin annular housing is configured to house a damping anti-shock bushing 27.

In accordance with an embodiment, said bushing is made of elastomeric material and comprises a plurality of axial recesses 30 adapted to retain a lubricant to allow a low friction sliding of the guide pin 2 in the sliding housing 103, and to reduce the contact surface between the guide pin 2 and the walls of the sliding housing 103.

In accordance with an embodiment, said guide pin 2 is made of steel.

In accordance with an embodiment, said guide pin 2 is made in one piece by molding. In accordance with an embodiment, said pin head 9 is made in one piece with said first pin coupling portion 4. In accordance with an embodiment, said guide pin 2 has no internal threaded holes.

The present invention also relates to a guide sleeve 3 for a floating caliper 101 of a disc brake. Said guide sleeve 3 is configured to couple to a guide pin 2 according to any one of the previously described embodiments.

Said guide sleeve 3 is configured to be placed between said caliper body 101 and said bracket 102.

Said guide sleeve 3 comprises a tubular sleeve body 10 configured to at least partially accommodate in a sliding manner a pin sliding portion 5 of a guide pin 2 guided in a sliding manner within a sliding housing 103 formed in said bracket 101 or in said caliper body 102 to allow a relative sliding between said caliper body 101 and said bracket 102 along an axial direction A-A. In accordance with an embodiment, said guide sleeve has a central hole passing along the axial direction A-A.

Said guide sleeve 3 is configured to deform to allow, without interfering, the relative sliding between the caliper body 101 and the bracket 102.

Said guide sleeve 3 comprises at least a first sleeve coupling portion 11, a sleeve sliding portion 12, a second sleeve coupling portion 13.

Said first sleeve coupling portion 11 is configured to connect said guide sleeve 3 to said guide pin 2.

Said sleeve sliding portion 12 is configured to internally receive at least one portion of said pin sliding portion 5.

Said second sleeve coupling portion 13 configured to be inserted into said sliding housing 103 and couple said guide sleeve 3 to said caliper body 101 or said bracket 102. Said sleeve sliding portion 12 comprising said second sleeve coupling portion 13.

Advantageously, said first sleeve coupling portion 11 is threaded to form a threaded coupling between said guide sleeve 3 and said guide pin 2.

In accordance with an embodiment, said guide sleeve 3 comprises a first sleeve sealing portion 14 which projects radially internally along a radial direction R-R perpendicular to said axial direction A-A towards said guide pin 2 so as to seal with a pin sealing portion 7 of said pin comprising a smooth, scratch-free surface. In accordance with an embodiment, said first sleeve sealing portion 14 is annular.

In accordance with an embodiment, said sleeve sliding portion 12 comprises a sleeve central portion 16 elastically reversible between an extended configuration and a retracted configuration.

In accordance with an embodiment, said sleeve central portion 16 is arranged between said first sleeve coupling portion 11 and said second sleeve coupling portion 13.

In accordance with an embodiment, said sleeve central portion 16 is adapted for allowing contactless sliding of said pin sliding portion 5 both in said retracted configuration and in said extended configuration.

In accordance with an embodiment, said sleeve body 10 extends between a first axial sleeve edge 20 and a second axial sleeve edge 21, wherein said first axial sleeve edge 20 defines said sleeve body 10 on the opposite side with respect to said second sleeve coupling portion 13.

In accordance with an embodiment, said guide sleeve 3 comprises a second sleeve sealing portion which projects in axial direction A-A from said first axial sleeve edge 20 to make a seal with the caliper body 102 or with the bracket 103 so as to protect said guide pin 2 from corrosive phenomena.

In accordance with an embodiment, said sleeve sliding portion 11 comprises a sleeve contact portion 24 which develops internally with respect to said second sleeve coupling portion 13 and configured to contact in a sliding relationship said pin sliding portion 5.

In accordance with an embodiment, said sleeve contact portion 24 has a plurality of sleeve axial grooves 23 so as to reduce the contact area between said guide sleeve 3 and said guide pin 2 and so as to create air evacuation channels between the pin sliding portion 5 and the sleeve contact portion 24 which allow to evacuate air from the sliding housing 103. In accordance with an embodiment, said contact portion has a second sleeve diameter D4, in which said second sleeve diameter D4 is substantially equal to said second pin diameter D2.

In accordance with an embodiment, said guide sleeve 3 is made of an elastomeric material compatible with a brake fluid and/or with a lubricant for the guide components, e.g. grease.

In accordance with an embodiment, said elastomeric material comprises rubber. In accordance with an embodiment, said rubber is EPFM rubber or a silicone material.

In accordance with an embodiment, said second sleeve coupling portion 13 protrudes radially outwardly from said sleeve body 10 to form an undercut connection with an annular fixing groove 105, made radially within said sliding housing 103.

In accordance with an embodiment, said first sleeve sealing portion 14 comprises a sleeve sealing tooth 15 that forms a first gasket integrated into said sleeve body 10. In accordance with an embodiment, said first gasket is an o-ring or a v-ring.

In accordance with an embodiment, said first axial sleeve edge 20 is an annular edge substantially perpendicular to said axial direction A-A. Said second sleeve sealing portion 18 comprises a sleeve sealing lip 19 that projects from said first axial sleeve edge 20 in axial direction A-A thus forming a cusp.

In accordance with an embodiment, said second sleeve sealing portion 18 forms a second gasket integrated into said sleeve body 10. In accordance with an embodiment, said sleeve sealing lip 19 is annular. In accordance with an embodiment, said second integrated gasket is a v-ring.

In accordance with an embodiment, said second sleeve coupling portion 13 is axially delimited by said second axial sleeve edge 21.

In accordance with an embodiment, said second sleeve coupling portion 13 comprises a sleeve fixing tooth 25 that develops mainly long said radial direction R-R with respect to a sleeve cylindrical portion 34 having parallel development with respect to said axial direction A-A.

In accordance with an embodiment, in a section passing through a plane comprising said axial direction A-A and a radial direction R-R perpendicular to it, said sleeve fixing tooth 25 forms in a root portion 31 an acute angle alpha with said sleeve cylindrical portion. In accordance with an embodiment, said acute angle alpha is between 90 and 70 degrees. In accordance with an embodiment, in a section passing through a plane comprising said axial direction A-A and a radial direction R-R perpendicular to it, said sleeve fixing tooth 25 comprises a lateral portion 32 which develops from said root portion 31 with an obtuse angle beta with respect to said axial direction A-A, until reaching a substantially cylindrical apical portion 33 with parallel development with respect to said axial direction A-A. According to an embodiment, said obtuse angle beta is comprised between 90 and 110 degrees.

In accordance with an embodiment, said sleeve fixing tooth 25, through said root portion 31 and said lateral portion 32 forming a tooth wedge portion, wedges against a respective wedge-shaped portion of the annular fixing groove 104 made radially in the sliding housing 103 formed in the bracket 102.

In accordance with an embodiment, said second sleeve coupling portion 13 comprises a sleeve fixing lip 22 that develops mainly along the axial direction A-A, in which said sleeve fixing lip 22 in a section with respect to a plane comprising said axial direction and said radial direction is substantially perpendicular to said sleeve fixing tooth 25.

In accordance with an embodiment, said sleeve fixing lip 22 is configured to be inserted into an annular housing made on an axially internal surface of said fixing groove 104, so as to form a tight fit of said second sleeve coupling portion 13 and said bracket 103. In accordance with an embodiment, said sleeve fixing lip 22 is configured to elastically urge said sleeve fixing tooth 25 against an opposite axially outer surface of said fixing groove 104, preferably wedge-shaped.

In accordance with an embodiment, said sleeve central portion 16 is folded into a bellows. In accordance with an embodiment, said central portion 16 comprises at least one bellows fold 17 extending into radial direction R-R allowing a reversible elongation of said guide sleeve 3 between the retracted configuration and the extended configuration. In accordance with an embodiment, said at least one bellows fold 17 comprises two bellows folds.

The present invention also relates to a guide 1 for a brake caliper 100 of the floating type for a disc brake.

Said guide 1 comprises a guide pin 2 according to one of the previously described embodiments, and a guide sleeve 3 according to one of the previous embodiments described, in which the guide pin 2 and the guide sleeve 3 are reversibly couplable with a threaded coupling.

In accordance with an embodiment, said first pin coupling portion 4 has a first pin diameter D1, and in which said first sleeve coupling portion 11 has a first sleeve diameter D3, wherein said first sleeve diameter D3 is smaller than said first pin diameter D1 so that said first sleeve coupling portion 11 is elastically biased against said first pin coupling portion 4 forming a threaded fit as tight as possible between said guide pin 2 and said guide sleeve 3. In accordance with an embodiment, said first pin diameter D1 is an M16 thread diameter. In accordance with an embodiment, said first sleeve diameter D3 is an M14 diameter. In accordance with an embodiment, thanks to the provision of the guide sleeve of elastic material, a threaded connection is possible between the first pin diameter D1 greater than the first sleeve diameter D3, ensuring an elastically tightened threaded coupling.

The present invention also relates to a maintenance kit for a brake caliper 100 of the floating type.

Said maintenance kit comprises two guide pins 2 according to one of the previously described embodiments, and two guide sleeves 3 according to one of the previously described embodiments. In accordance with an embodiment, said two guide pins 2 are: a main guide pin comprising said at least one axial pin groove and a secondary guide pin comprising said at least one annular pin housing where said damping anti-shock bushing is housed.

The present invention also relates to a brake caliper 100 of the floating type comprising a caliper body 101 mechanically connected to a bracket 102 in a sliding manner by means of at least one guide 1 according to any one of the previously described embodiments, in which said at least one guide 1 is interposed between said caliper body 101 and said bracket 102.

In accordance with an embodiment, at least one sliding housing 103 is formed in said bracket 102, so that said guide pin 1 is sliding in said bracket 102. In accordance with an embodiment, at least one fixing housing is formed in said caliper body 102, so that said guide pin 1 is couplable to said caliper body 102. In accordance with an embodiment, said fixing housing is threaded to connect by a threaded connection with said second pin coupling portion. In accordance with an embodiment, said guide sleeve is coupled to said sliding housing, in particular in an annular fixing housing in which said second sleeve coupling portion is inserted. In accordance with an embodiment, said annular fixing housing has, in a section along a plane comprising said axial direction A-A and a radial direction R-R perpendicular to it, a complementary profile with respect to said second sleeve coupling portion 13, as previously described.

In accordance with an embodiment, said bracket 103 is adapted to be mounted on a fixed portion of a vehicle. In accordance with an embodiment said brake caliper 100 comprises a first pad and a second pad housed in respective housings formed on said bracket.

The present invention also relates to an assembly method for a brake caliper 100 of the floating type.

The method comprises the following steps:

providing a caliper body 101 and a bracket 102, in which the caliper body 101 is mechanically connectible in a sliding manner to the bracket 102. In accordance with an operating mode, said caliper body 101 and said bracket 102 are in accordance with one of the previously described embodiments.

The method comprises the following steps:

providing a guide pin 2 according to any one of the previously described embodiments;

providing a guide sleeve 3 according to any one of the previously described embodiments;

coupling said second sleeve coupling portion 13 to said sliding housing 103 made in said caliper body 101 or said bracket 102;

approaching the caliper body 101 to said guide sleeve 3 compressing it;

inserting said guide pin 2 in a fixing housing 105 made in said caliper body 101 or in said bracket 102, in said guide sleeve 3 and in said sliding housing 103, in which said fixing housing 105 is coaxial to said sliding housing 103. In accordance with an operating mode, the method comprises the step of lubricating said pin sliding portion 5 before the inserting step.

The method comprises the step of:

screwing said guide pin 2 coupling said first pin coupling portion 4 to said first sleeve coupling portion 11 and said second pin coupling portion 4 to said fixing housing 105.

LIST OF REFERENCE SIGNS

1 guide
2 guide pin
3 guide sleeve
4 first pin coupling portion
5 pin sliding portion
6 second pin coupling portion
7 pin sealing portion
8 pin longitudinal grooves
9 pin head
10 tubular sleeve body
11 first sleeve coupling portion
12 sleeve sliding portion
13 second sleeve coupling portion
14 first sleeve sealing portion
15 sleeve sealing tooth
16 sleeve central portion
17 sleeve bellows fold
18 second sleeve sealing portion
19 sleeve sealing lip
20 first axial sleeve edge

21 second axial sleeve edge
22 sleeve fixing lip
23 sleeve longitudinal grooves
24 sleeve contact portion
25 sleeve fixing tooth
26 pin tip
27 damping anti-shock bushing
28 pin groove
29 pin tapered portion
30 axial recesses
31 tooth root portion
32 tooth lateral portion
33 tooth top portion
34 sleeve cylindrical portion
100 brake caliper
101 caliper body
102 bracket
103 sliding housing
104 fixing groove
105 fixing housing
D1 first pin diameter
D2 second pin diameter
D3 first sleeve diameter
D4 second sleeve diameter
A-A axial direction
R-R radial direction
p-p pin axis

The invention claimed is:

1. A guide pin for a brake caliper of a floating type of a disc brake, wherein said brake caliper comprises a caliper body and a bracket, wherein said guide pin is configured to be arranged between said caliper body and said bracket to allow a relative sliding between said caliper body and said bracket along an axial direction (A-A), and wherein said guide pin is configured to connect to a guide sleeve and slide at least partially within said guide sleeve, wherein said guide pin comprises:

a first pin coupling portion configured to couple said guide pin to said guide sleeve;

a pin sliding portion configured to guide in a sliding manner said guide pin into a sliding housing obtained in either said caliper body or said bracket;

a second pin coupling portion directly threaded to either said bracket or said caliper body, wherein said first pin coupling portion is arranged between said second pin coupling portion and said pin sliding portion, wherein said first pin coupling portion is threaded to form a direct threaded connection between said guide pin and said guide sleeve.

2. A guide pin according to claim 1, comprising a pin sealing portion configured to connect tightly with said guide sleeve, wherein said pin sealing portion is a smooth, ridge-free portion, wherein said pin sealing portion is arranged between said first pin coupling portion and said pin sliding portion;

and/or wherein said guide pin is configured to be inserted into a fixing housing made in either said bracket or said caliper body, wherein said fixing housing is coaxial and opposite to said sliding housing, wherein said second pin coupling portion is threaded to make a threaded fit with a threaded portion of said fixing housing;

and/or wherein said first pin coupling portion and said second pin coupling portion form a seamless threaded pin portion;

and/or wherein said guide pin is configured to couple with said guide sleeve, wherein where said guide sleeve is coupled to said guide pin the guide pin is groove less.

3. A guide pin according to claim 1, wherein said guide pin extends along a pin axis parallel to said axial direction, wherein said guide pin is axially symmetrical relative to said pin axis and/or is symmetrical relative to a symmetry plane passing through said pin axis;

and/or wherein said guide pin comprises in succession a pin head configured to abut with said caliper body when said second pin coupling portion is fully coupled to either said bracket or said caliper body;

and/or wherein said first coupling portion and said second pin coupling portion have substantially the same diameter, wherein said pin sliding portion is tapered relative to said first coupling portion;

and/or wherein said pin sliding portion comprises at least one longitudinal groove which extends from a pin tip allowing air to vent from the sliding housing during an assembly operation of the brake caliper, preferably said pin sliding portion is a cylindrical pin portion and said at least one groove forms flat surfaces recessed in said cylindrical pin portion, said at least one axial groove preferably comprises three axial grooves;

and/or wherein said guide pin is made of steel and/or wherein said guide pin is made in one piece by molding;

and/or wherein said pin head is made in one piece with said first pin coupling portion;

and/or wherein said guide pin is free from internal threaded holes.

4. The guide pin according to claim 1, wherein the guide sleeve is coupled to the guide pin exclusively via a threaded engagement.

5. The guide pin according to claim 1, wherein said pin sliding portion has an annular pin housing to receive a damping anti-shock bushing, wherein said bushing is made of an elastomeric material and comprises a plurality of axial recesses adapted to retain lubricant to allow the low-friction sliding of the guide pin in the pin housing.

6. A guide for a brake caliper of a floating type of a disc brake, comprising a guide pin, wherein said guide pin is configured to be arranged between a caliper body and a bracket to allow a relative sliding between said caliper body and said bracket along an axial direction, and wherein said guide pin is configured to connect to a guide sleeve and slide at least partially within said guide sleeve, wherein said guide pin comprises:

a first pin coupling portion configured to couple said guide pin to said guide sleeve;

a pin sliding portion configured to guide in a sliding manner said guide pin into a sliding housing obtained in either said caliper body or said bracket;

a second pin coupling portion directly threaded to either said bracket or said caliper body, wherein said first pin coupling portion is arranged between said second pin coupling portion and said pin sliding portion, wherein said first pin coupling portion is threaded to form a direct threaded connection between said guide pin and said guide sleeve, said guide sleeve, wherein said guide sleeve is configured to be arranged between said caliper body and said bracket, wherein said guide sleeve comprises a tubular sleeve body configured to at least partially accommodate in a sliding manner a pin sliding portion of said guide pin guided in a sliding manner within a sliding housing formed in either said caliper body or said bracket to allow the relative sliding between said caliper body and said bracket along an axial direction, wherein said guide sleeve is configured to deform to allow the relative sliding between the caliper body and the bracket;

wherein said guide sleeve comprises a first sleeve coupling portion configured to connect said guide sleeve to said guide pin, a sleeve sliding portion configured to internally receive at least one portion of said pin sliding portion, wherein said sleeve sliding portion comprises a second sleeve coupling portion configured to be inserted into said sliding housing and couple said guide sleeve to either said caliper body or said bracket, wherein said first sleeve coupling portion is threaded to form a threaded coupling between said guide sleeve and said guide pin, wherein said guide pin is connectible to said guide sleeve by a threaded coupling, wherein said second sleeve coupling portion radially protrudes outwardly from said sleeve body to form an undercut connection with an annular fixing groove, made radially within said sliding housing.

7. A guide according to claim 6, wherein said first pin coupling portion has a first pin diameter, and wherein said first sleeve coupling portion has a first sleeve diameter, wherein said first sleeve diameter is smaller than said first pin diameter so that said first sleeve coupling portion is elastically biased against said first pin coupling portion forming a threaded fit as tight as possible between said guide pin and said guide sleeve.

8. The brake caliper comprising the caliper body, mechanically connected in a sliding manner to the bracket, connectible to a vehicle by means of at least one guide according to claim 6.

9. The guide pin according to claim 6, wherein said tubular sleeve body comprises said first sleeve coupling portion and said sleeve sliding portion.

10. The guide according to claim 6, wherein said guide sleeve has a plurality of axial sleeve grooves, wherein said tubular sleeve body extends between a first axial sleeve edge and a second sleeve axial edge, wherein the first axial sleeve edge is an annular edge perpendicular to said axial direction, wherein said guide sleeve further comprises a first sleeve sealing portion which radially and internally protrudes along a radial direction, and a second sleeve sealing portion, wherein said second sleeve sealing portion comprises an annular sleeve sealing lip that projects from said first axial sleeve edge in the axial direction forming a cusp.

11. The guide according to claim 6, comprising a first sleeve sealing portion which protrudes along a radial direction perpendicular to said axial direction towards said guide pin to seal with a pin sealing portion of said guide pin comprising a smooth, ridge-free surface, wherein said first sleeve sealing portion is annular;

and/or wherein said sleeve sliding portion comprises a central sleeve portion elastically reversible between an extended configuration and a retracted configuration, wherein said central sleeve portion is arranged between said first sleeve coupling portion and said second sleeve coupling portion, wherein said central sleeve portion is adapted to allow a contact-free sliding of said pin sliding portion in both said retracted configuration and said extended configuration;

wherein said first axial sleeve edge delimits said sleeve body on the opposite side from said second sleeve coupling portion, wherein said guide sleeve comprises a second sleeve sealing portion which protrudes in an axial direction from said first axial sleeve edge to achieve a seal either with bracket or caliper body to protect said guide pin from corrosion;

and/or wherein said sleeve sliding portion comprises a sleeve contact portion which extends internally relative to said second sleeve coupling portion and configured to contact in a sliding relationship said pin sliding portion, wherein said sleeve contact portion has a plurality of axial sleeve grooves to reduce the contact area between said guide sleeve and said guide pin and to make air evacuation channels between said pin sliding portion and said sleeve contact portion which allow air to be evacuated from said sliding housing;

and/or wherein said guide sleeve is made of an elastomeric material compatible with brake fluid and/or guide lubricant, wherein said elastomeric material comprises rubber and/or EPFM rubber or a silicone material;

and/or wherein said second sleeve coupling portion radially protrudes outwardly from said sleeve body to form an undercut connection with an annular fixing groove, made radially within said sliding housing.

12. The guide according to claim 11, wherein said first sleeve sealing portion comprises a sleeve sealing tooth forming a first gasket integrated into said sleeve body, wherein said first gasket is an o-ring;

wherein an annular sleeve sealing lip protrudes from a first axial sleeve edge in said axial direction forming a cusp, wherein said second sleeve sealing portion forms a second gasket integrated into said sleeve body, wherein said second gasket is a v-ring;

wherein said second sleeve coupling portion is axially delimited by said second sleeve axial edge, wherein said second sleeve coupling portion comprises a sleeve fixing tooth which prevalently extends along said radial direction relative to a cylindrical sleeve portion having development parallel to said axial direction, wherein said second sleeve coupling portion comprises a sleeve fixing lip which extends prevalently along the axial direction, wherein said sleeve fixing lip is configured to be inserted into an annular housing made on an axially inner surface of said fixing groove, to form a tight fit of said second sleeve coupling portion and said bracket;

wherein a central sleeve portion is folded into a bellows comprising at least one bellows fold which extends in a radial direction allowing a reversible elongation of said guide sleeve.

13. A guide according to claim 12, wherein said sleeve sealing tooth is between the first sleeve coupling portion and the central sleeve portion.

* * * * *